US011299695B2

United States Patent
Mitchell et al.

(10) Patent No.: US 11,299,695 B2
(45) Date of Patent: Apr. 12, 2022

(54) BEER MAKING MACHINE WITH DIRECT STEAM INJECTION

(71) Applicant: PicoBrew, LLC, Seattle, WA (US)

(72) Inventors: James B. Mitchell, Seattle, WA (US); Avi R. Geiger, Seattle, WA (US)

(73) Assignee: PB Funding Group, LLC, Bellevue, WA (US)

( * ) Notice: Subject to any disclaimer, the term of this patent is extended or adjusted under 35 U.S.C. 154(b) by 310 days.

(21) Appl. No.: 16/022,172

(22) Filed: Jun. 28, 2018

(65) Prior Publication Data

US 2018/0305647 A1     Oct. 25, 2018

Related U.S. Application Data

(62) Division of application No. 14/807,753, filed on Jul. 23, 2015, now Pat. No. 10,035,979.

(51) Int. Cl.
*C12C 7/20* (2006.01)
*C12C 7/06* (2006.01)
(Continued)

(52) U.S. Cl.
CPC ............... *C12C 7/20* (2013.01); *C12C 7/06* (2013.01); *F04B 23/02* (2013.01); *F04B 49/065* (2013.01); *F04B 2205/11* (2013.01)

(58) Field of Classification Search
CPC .......... A23G 9/045; C12C 13/10; C12C 7/17; C12C 7/22; C12C 7/04; C12C 11/003;
(Continued)

(56) References Cited

U.S. PATENT DOCUMENTS 941,009 A    11/1909 Cauchois
2,547,481 A   4/1951 J
(Continued)

FOREIGN PATENT DOCUMENTS

DE    202012103852 U1    11/2012
GB         1444344 A      7/1976
(Continued)

OTHER PUBLICATIONS

Aurora Haley, "Icon Usability" published Jul. 27, 2014, Nielsen Norman Group, 8 pages.
(Continued)

*Primary Examiner* — Dana Ross
*Assistant Examiner* — Joseph W Iskra
(74) *Attorney, Agent, or Firm* — Krajec Patent Offices, LLC; Russell Krajec

(57) ABSTRACT

A beer making system may use direct steam injection during wort manufacturing. Steam may be added directly to the wort, and may be part of a recirculating mash system. The steam may be the primary mechanism for adding heat to the system, and may eliminate many problems that often occur when using conventional heating systems. A water reservoir may feed a stream generator, which may inject steam into wort during mashing or boiling steps. A controller may monitor temperature and other parameters, and may calculate the dilution of wort based on the water added through the steam injection and allow a brewing system to compensate for said dilution and still produce desired results.

9 Claims, 6 Drawing Sheets

(51) Int. Cl.
*F04B 49/06* (2006.01)
*F04B 23/02* (2006.01)

(58) Field of Classification Search
CPC .. C12C 5/004; C12C 3/08; C12C 7/06; C12C 7/20; C12G 1/02; C12G 3/065; C12G 3/02; A47J 31/005; A47J 31/52; A47J 31/047; A47G 19/14; A21B 7/005; A23L 1/1055; A23L 1/0135; A23F 3/163; C12H 1/0408; C12H 1/14; B02B 1/08; F04B 2205/11; F04B 23/02; F04B 49/065
USPC ...... 99/275–281, 288, 326, 334; 426/11, 16, 426/28–30, 330.3, 330.4, 507, 520, 592, 426/600
See application file for complete search history.

(56) References Cited

U.S. PATENT DOCUMENTS

| | | | |
|---|---|---|---|
| 2,761,200 | A | 9/1956 | Arnett |
| 2,830,528 | A | 4/1958 | Arnett |
| 3,057,726 | A | 10/1962 | Teignmouth |
| 3,102,813 | A | 9/1963 | Teignmouth et al. |
| 3,232,211 | A * | 2/1966 | O'Malley ................. C12C 7/01 99/278 |
| 3,563,157 | A | 2/1971 | Lenz |
| 3,683,790 | A | 8/1972 | Black et al. |
| 3,759,483 | A | 9/1973 | Baxter |
| 3,984,326 | A | 10/1976 | Bendel |
| 4,054,523 | A | 10/1977 | Ingenito et al. |
| 4,373,024 | A | 2/1983 | Hunt |
| 4,441,406 | A | 4/1984 | Becker et al. |
| 4,503,502 | A | 3/1985 | Chapin |
| 4,552,060 | A | 11/1985 | Redl et al. |
| 4,557,186 | A | 12/1985 | Brown |
| 4,751,875 | A | 6/1988 | Wooten |
| 4,754,696 | A | 7/1988 | Sarazen et al. |
| 4,754,698 | A | 7/1988 | Naish |
| 4,790,239 | A | 12/1988 | Hewitt |
| 4,846,969 | A | 7/1989 | Ordelheide et al. |
| 5,158,793 | A | 10/1992 | Helbling |
| 5,265,518 | A | 11/1993 | Reese et al. |
| 5,311,811 | A | 5/1994 | Kuzyk |
| 5,413,566 | A | 5/1995 | Sevrain et al. |
| 5,865,093 | A | 2/1999 | Wasmuht et al. |
| 5,868,062 | A | 2/1999 | Enomoto |
| 5,906,151 | A | 5/1999 | Firestone et al. |
| 5,922,191 | A | 7/1999 | Mata et al. |
| 5,970,846 | A | 10/1999 | Roehr |
| 6,032,571 | A | 3/2000 | Brous et al. |
| 6,276,264 | B1 * | 8/2001 | Dumm .................... A01J 11/00 165/61 |
| 6,475,537 | B1 | 11/2002 | King et al. |
| 6,629,490 | B1 | 10/2003 | Lu et al. |
| 6,666,967 | B1 | 12/2003 | Oyabu |
| 7,856,875 | B2 * | 12/2010 | Jeon ........................ A47J 31/56 73/290 R |
| 7,963,213 | B1 | 6/2011 | Murdock |
| 8,141,477 | B2 | 3/2012 | Broderick |
| 8,993,273 | B1 | 3/2015 | Blichmann |
| 9,102,908 | B1 | 8/2015 | Mitchell et al. |
| 9,109,192 | B1 | 8/2015 | Mitchell et al. |
| 9,228,163 | B1 | 1/2016 | Mitchell et al. |
| 9,376,653 | B1 | 6/2016 | Mitchell et al. |
| 9,688,949 | B2 | 6/2017 | Mitchell et al. |
| 9,932,547 | B2 | 4/2018 | Mitchell et al. |
| 2001/0035097 | A1 | 11/2001 | Shaanan et al. |
| 2002/0029694 | A1 | 3/2002 | Wong |
| 2003/0019031 | A1 | 1/2003 | Mosis |
| 2003/0153059 | A1 * | 8/2003 | Pilkington .............. C12C 11/09 435/161 |
| 2005/0011364 | A1 | 1/2005 | Chen et al. |
| 2005/0103213 | A1 * | 5/2005 | Dumm .................. A23C 3/031 99/483 |
| 2005/0160917 | A1 | 7/2005 | Gantt et al. |
| 2008/0000357 | A1 | 1/2008 | Yang et al. |
| 2008/0282897 | A1 | 11/2008 | Webster et al. |
| 2009/0007796 | A1 | 1/2009 | Ricotti |
| 2009/0229471 | A1 | 9/2009 | Lun |
| 2009/0246341 | A1 | 10/2009 | Pitner et al. |
| 2010/0064900 | A1 | 3/2010 | Reyhanloo |
| 2010/0107887 | A1 | 5/2010 | Bentley et al. |
| 2010/0236949 | A1 | 9/2010 | Vacca et al. |
| 2010/0313765 | A1 | 12/2010 | Hale |
| 2011/0246091 | A1 | 10/2011 | Fedele |
| 2011/0268846 | A1 | 11/2011 | Nair et al. |
| 2012/0310413 | A1 | 12/2012 | Bluck et al. |
| 2013/0202487 | A1 | 8/2013 | Gorelik et al. |
| 2014/0017354 | A1 | 1/2014 | Joseph et al. |
| 2014/0092706 | A1 | 4/2014 | Ishii |
| 2014/0234482 | A1 | 8/2014 | Kempfert |
| 2014/0287129 | A1 * | 9/2014 | Hutcheson ............. C12C 7/053 426/618 |
| 2015/0000530 | A1 | 1/2015 | Mitchell et al. |
| 2015/0000531 | A1 | 1/2015 | Mitchell et al. |
| 2015/0000532 | A1 | 1/2015 | Mitchell et al. |
| 2015/0161871 | A1 | 6/2015 | Kim |
| 2015/0257573 | A1 | 9/2015 | Gabara |
| 2016/0075979 | A1 | 3/2016 | Mitchell |
| 2016/0272927 | A1 | 9/2016 | Mitchell |
| 2016/0272928 | A1 | 9/2016 | Mitchell |
| 2017/0022462 | A1 | 1/2017 | Mitchell et al. |
| 2017/0029752 | A1 | 2/2017 | Mitchell et al. |
| 2017/0051236 | A1 | 2/2017 | Mitchell |
| 2017/0130177 | A1 | 5/2017 | Geiger |
| 2017/0130178 | A1 | 5/2017 | Mitchell |
| 2017/0321810 | A1 | 11/2017 | Geiger |
| 2018/0057778 | A1 | 3/2018 | Mitchell |
| 2018/0171273 | A1 | 6/2018 | Mitchell et al. |

FOREIGN PATENT DOCUMENTS

| | | |
|---|---|---|
| WO | 2015173037 A1 | 11/2015 |
| WO | 2016057981 A1 | 4/2016 |

OTHER PUBLICATIONS

BeerSmith 2 (www.youtube.com/watch?v=68t9_IK-4vY) published Jun. 5, 2011 and accessed Mar. 5, 2018.
BeerTools Pro 1.5 Brewing Software in (www.youtube.com/watch?v=REgYNF_3SZc) published online Mar. 21, 2011 and accessed Mar. 5, 2015.
International Search Report, Intellectual Property Office of Singapore, PCT/IB2017/052677, dated Feb. 8, 2017.
Jeff Flowers, How to Raise the ABV of Your Homebrew, May 1, 2014, https://learn.kegerator.com/raising-abv/ (accessed Mar. 1, 2018), pp. 1-10.
Ken Schwartz, Son of Fermentation Chiller or, "Better Late than Never . . . ", pp. 1-14, 1997.
Vinepair, Tasting Beer—The Role of Alcohol By Volume (ABV) https://vinepair.com/beer-101/tasting-beer-the-role-of-alcohol-by-volume-abv/ (accessed Mar. 1, 2018), pp. 1-5.
Written Opinion of ISA, Intellectual Property Office of Singapore, PCT/IB2017/052677, dated Feb. 8, 2017.

* cited by examiner

BEER MAKING MACHINE WITH DIRECT STEAM INJECTION

CROSS REFERENCE TO RELATED APPLICATIONS

This application is a divisional application of and claims priority to and benefit of U.S. patent application Ser. No. 14/807,753 entitled "Beer Making Machine with Direct Steam Injection" filed 23 Jul. 2015, the entire contents of which are hereby expressly incorporated by reference for all it discloses and teaches.

BACKGROUND

Beer making has existed since before the days of Pharaoh. The beer making process has been modified and improved upon over the ages. The typical beer making process today involves malting barley which prepares starches for an enzymatic conversion of the starches to sugars in a process known as mashing, then boiling the sugars prior to adding yeast to ferment the sugars into alcohol. The liquid manufactured prior to adding yeast is known as beer wort.

The machinery for brewing beer may involve industrial sized systems that may process many thousands of gallons at a time, professional craft beer brewing equipment which may be process much smaller batches, and home brewing equipment which may process as little as a gallon in each batch. In each case, the basic brewing process may be the same.

SUMMARY

A beer making system may use direct steam injection during wort manufacturing. Steam may be added directly to the wort, and may be part of a recirculating mash system. The steam may be the primary mechanism for adding heat to the system, and may eliminate many problems that often occur when using conventional heating systems. A water reservoir may feed a stream generator, which may inject steam into wort during mashing or boiling steps. A controller may monitor temperature and other parameters, and may calculate the dilution of wort based on the water added through the steam injection.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
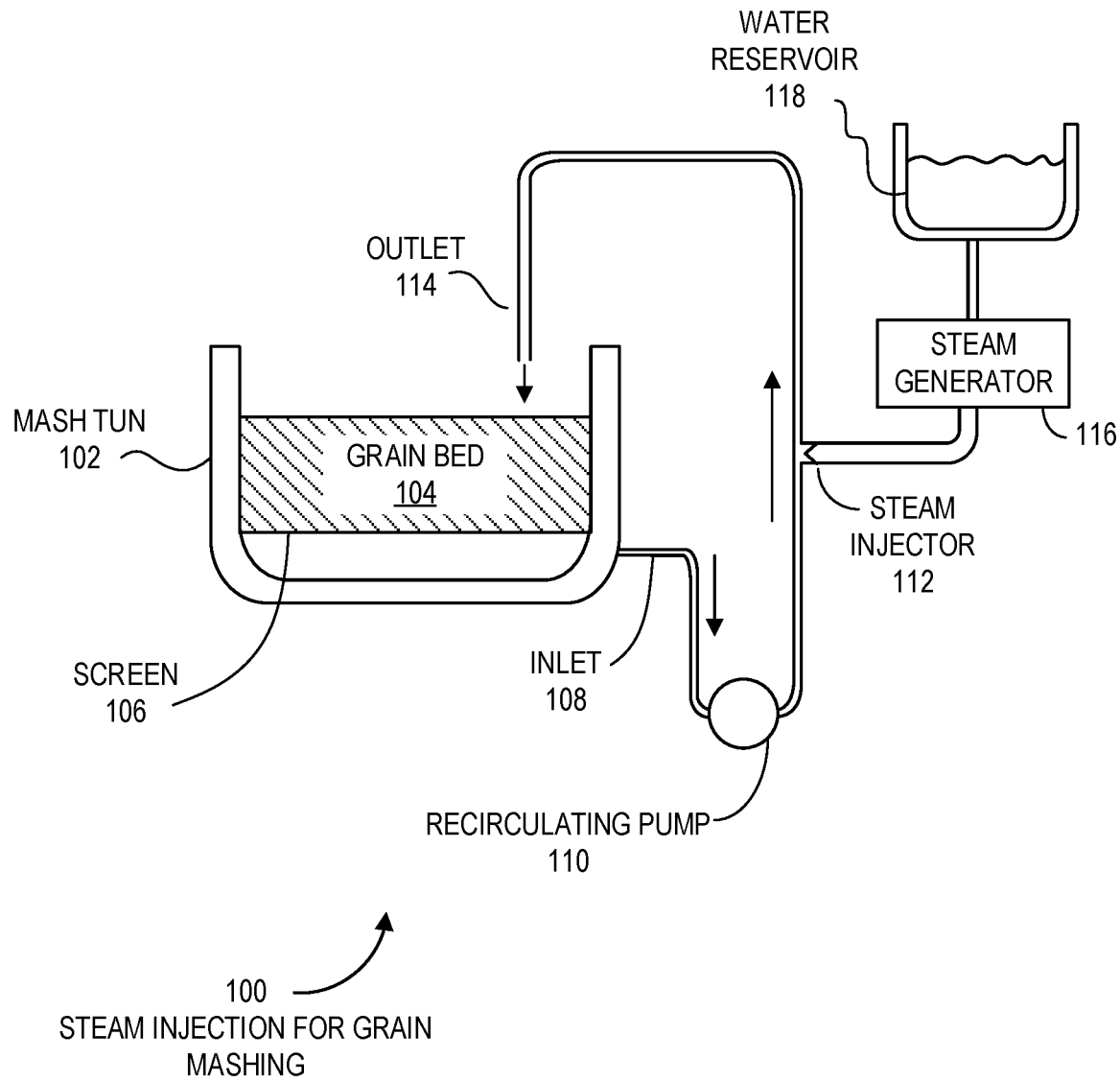
FIG. 1 is a diagram illustration of an embodiment showing a recirculating mashing system with steam injection.

Beer Making Machine with Direct Steam Injection

A steam injector may create and inject steam into wort during mashing or boiling stages of beer making. The steam injector may convert water into steam, then inject the steam directly into the fluid, thereby heating the fluid.

In many cases, the steam injector may use water that is separate from the wort. For example, a system may have a reservoir or other water source from which steam may be generated. In such cases, the heating mechanism used to add heat to the overall system may process only water and may not be exposed to the sugars and other materials present in the wort.

Because wort may contain sugars and other materials, heating the wort to boiling often produces some unwanted characteristics, not the least of which is the difficulty of cleaning a heating mechanism. For example, brew kettles that may be heated with direct flame may caramelize some of the sugars on the bottom of the kettle, resulting in some off flavors but also creating a difficult cleaning problem.

Other systems for heating during mashing or boiling may also cause cleaning issues. Recirculating Infusion Mash Systems (RIMS) and Heat Exchanger Recirculating Mash Systems (HERMS) are two conventional systems that recirculate mash liquid and apply heat to the liquid in a recirculating circuit. Such systems often build up sticky sugars and other materials in the heating section, resulting in a cleaning problem.

A steam generation and injection system may eliminate many cleaning problems of a beer making system by eliminating contact between wort and relatively high temperature heat sources. Such issues may be a problem in consumer-level devices as well as commercial systems.

A steam generator and injector may have a water source, such as a reservoir, a pump to deliver and meter water to a heater which produces steam, and an injector mechanism to add the steam to wort. The system may include a temperature controller which may generate steam until a desired wort temperature is achieved.

A controller may also determine the amount of water added to a batch of wort in the form of steam. Adding water in the form of steam may dilute the wort. In some cases, a recipe may start with a reduced amount of water and may be designed to achieve a desired specific gravity by considering the amount of water added through the steam heating process.

In cases where the heating process may consume less water than anticipated, the controller may cause additional water to be added through the steam generator system but without necessarily heating the water to steam. Such a step may dilute the wort to a desired level, without unintentionally affecting the overall temperature of the wort In the case where the heating process consumes much more water than anticipated, a system that uses only steam injection heating may have no mechanism to boil off or otherwise dilute the wort to a desired specific gravity. Because of this issue, many systems may pre-design recipes anticipating that the resulting wort may be diluted by adding water near the end of the heating process.

A beer making system may have a recirculating mashing or boiling system that may have a steam injection system. The machine may have a pump that may recirculate wort through a steam injector and return the heated wort. In a mashing operation, such a system may recirculate the heated wort to a grain bed during mashing and sparging operations. During a boiling operation, such a system may recirculate the heated wort back to vessel or reservoir for the boiling wort.

The term "boiling" step may refer to the portion of wort manufacturing where the wort is raised to a high temperature. Such a step may remove unwanted bacteria, stop the enzymatic reaction during mashing, sterilize the wort, precipitate various proteins from the mashing process, extract various components from hops added during the boil step, and other processes.

The "boiling" step as referred to in this specification and claims may refer to bringing wort to a high temperature, typically in excess of 190 F, either with or without the physical boiling action. In some instances, a rolling boil may be achieved, but in other instances, a physical "boil" process may not be achieved. Such a "boil" step may produce many of the same desired outcomes, such as sterilization, isomerization of hops, stopping the enzymatic processes, and others, without the physical rolling boil.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors, which may be on the same device or different devices, unless expressly specified otherwise.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram illustration of an embodiment 100 showing a recirculating brewing system with steam injection. Embodiment 100 is an example of a mashing system that may be heated by injecting steam into a recirculating wort path.

By injecting steam directly into the wort, the heat contained in the steam may be transferred into the wort. The recirculating system may mix and disperse the heated wort, thereby raising the temperature of the wort in a consistent manner.

The steam temperature may be any temperature above boiling. In some cases, steam temperature may be 220 F, 250 F, 300 F, or higher. Because the heat transferred is largely due to the phase change energy rather than the temperature change of the steam when injected, the temperature control of the steam need not be highly precise.

Embodiment 100 illustrates a recirculating mash system where a mash tun 102 may contain a grain bed 104 located above a screen 106. An inlet 108 to a recirculating pump 110 may draw liquid from the bottom of the mash tun 102 and pass the liquid past a steam injector 112 to an outlet 114.

The recirculating system of embodiment 100 is a simplified version of a typical system. In many cases, such a system may have a mechanism to heat the water prior to introducing the water to the grain bed 104. Such a mechanism is not illustrated here.

A mashing system may use a grain bed 104 that may contain malted barley and other grains that may have been crushed in a mill. A mashing process may begin with water preheated to a specific temperature, then introducing the water to the grain bed. As the water flows through the grain bed, the temperature may be raised or lowered according to a schedule. During the mashing process, various enzymes in the grains may extract sugars from the grains, thereby producing wort.

In a typical mash schedule, the liquid may have a temperature from 130 F to 170 F, although different mashing schedules may have temperatures above and below those temperatures.

A steam generator 116 may create steam from a water reservoir 118. A more detailed description of a steam generator 116 may be found later in this specification.

Some systems may have a programmable controller that may control the recirculating pump 110 and steam generator 116. Such a system may typically operate the recirculating pump 110 continually during a mash cycle, and the steam generator 116 may add heat in response to a temperature input, adding steam when the temperature is below a desired set point and not adding steam when the actual temperature is within range of the set point.

In many mashing schedules, the set point temperature may be varied through the mash process. Some mash schedules may additionally have temperature ramps where the set point may increase or decrease over time at a predefined function. The function may be a straight-line ramp, exponential curve, or other function.

Figure 2A:
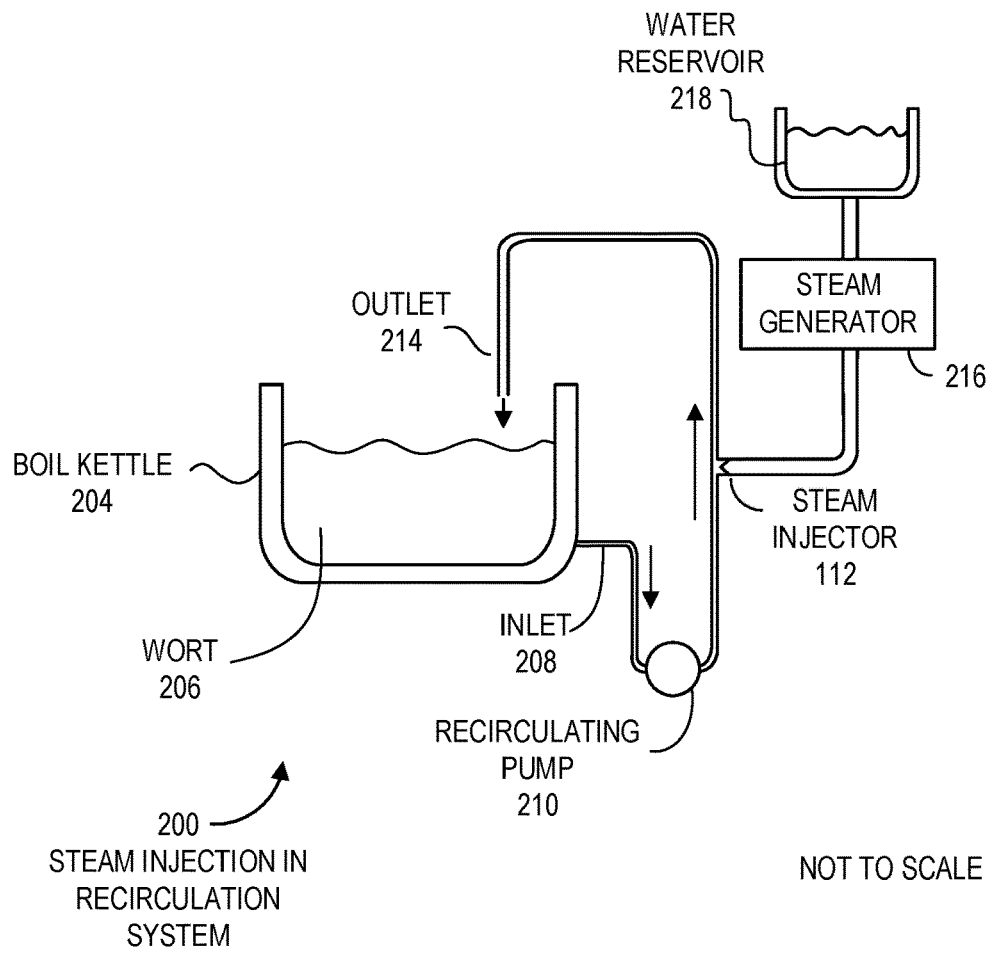
FIG. 2A is a diagram illustration of an embodiment showing a boiling system with steam injection in a recirculating system.
Figure 2B:
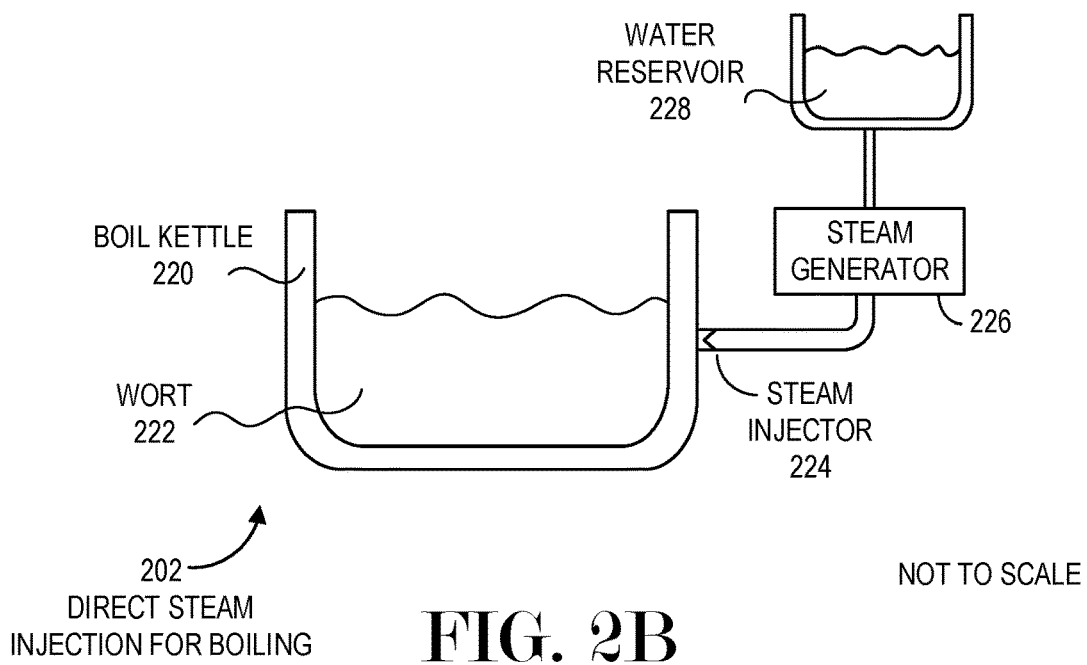
FIG. 2B is a diagram illustration of an embodiment showing a boiling system with direct steam injection.

FIGS. 2A and 2B are example configurations of a brewing system that uses steam injection during a boiling cycle for beer brewing. FIG. 2A may illustrate embodiment 200 showing a recirculating system with steam injection, while FIG. 2B may illustrate embodiment 202 showing direct injection of steam into a boil kettle.

Like with the mashing system of embodiment 100, steam may be a useful heat source for a boiling operation. Traditional brewing systems may achieve a rolling boil during the boiling cycle, while some systems may only achieve a temperature near the boiling temperature, typically 212 degrees F.

The boiling cycle of beer making performs two functions. The first function may be to stop the enzymatic operations of the mash cycle and the second function may be to create bitterness, aroma and/or flavors through interactions with hop organic matter including alpha and beta acids and oils. Other functions may occur as well during the boiling cycle, but many if not all the functions may occur without achieving an active boil and by keeping the temperature of the wort below its normal boiling temperature.

Embodiment 200 illustrates a system where heat may be added through steam injection in a recirculating circuit. A boil kettle 204 may contain wort 206. An inlet 208 may supply a recirculating pump 210, which may cause wort to pass past a steam injector 212 and to an outlet 214 to be reintroduced to the boil kettle 204.

The steam injector 212 may emit steam generated by a steam generator 216, which may generate steam from a water reservoir 218 or other water source.

Embodiment 202 illustrates a system where heat may be added through direct steam injection into a boil kettle 220. In such a system, a boil kettle 220 may contain wort 222 that may be heated by a steam injector 224 that may introduce steam directly into the wort 222. A steam generator 226 may supply the steam from a water reservoir 228.

Figure 3:
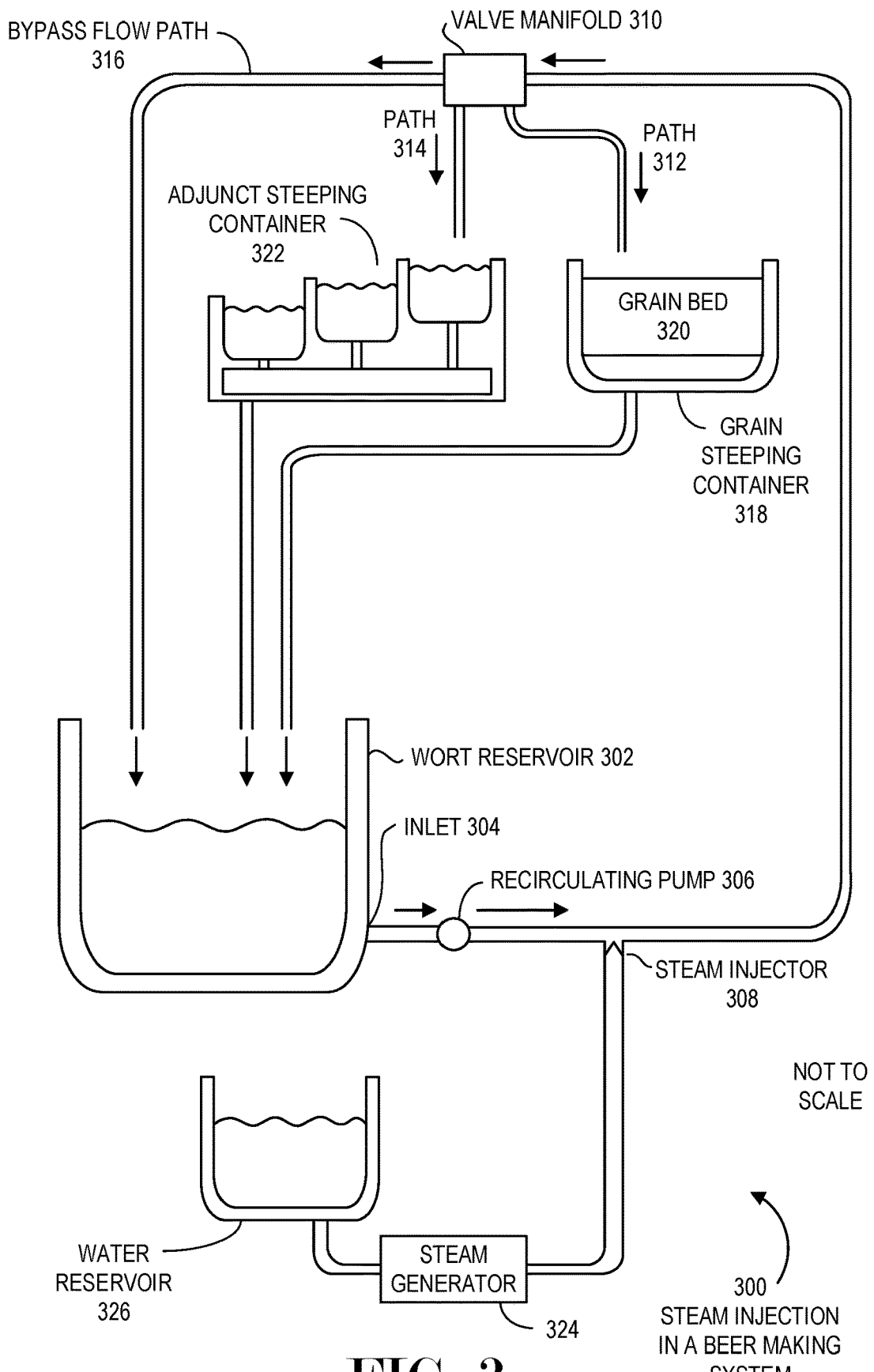
FIG. 3 is a diagram illustration of an embodiment showing a recirculating system capable of mashing and boiling.

FIG. 3 is a diagram illustration of an embodiment 300 showing a multi-stage beer making system with steam injection. Embodiment 300 may illustrate a system that may use a single wort reservoir 302, and may perform steps of mashing and boiling.

Embodiment 300 may use a recirculating circuit in which steam may be injected for heating wort during various stages of beer wort manufacture. The recirculating circuit may include an inlet 304, a recirculating pump 306, a steam injector 308, and a valve manifold 310. The valve manifold 310 may be switchable to a flow path 312 for grain mashing, a flow path 314 for a boil cycle, and a bypass flow path 316.

The bypass flow path 316 may be used to raise the temperature of the liquid in the wort reservoir 302. The steam injector 308 may heat the water to a desired temperature through the bypass flow path 316. This may be used, for example, to heat water prior to starting a mash cycle.

A mash cycle may involve introducing the water into the grain steeping container 318 and a grain bed 320 through flow path 312. During a mash cycle, the steam injector 308 may add heat to the recirculating liquid to maintain a desired temperature, as well as to raise the temperature according to a temperature profile.

After completing a mash cycle, the valve manifold 310 may be changed to path 314, where wort may be passed through an adjunct steeping container 322. The adjunct steeping container 322 may contain hops or other adjuncts that may be introduced in the recirculating circuit during a boil cycle. The steam injector 308 may add heat to the recirculating liquid to raise the temperature of the liquid to below, above or near its boiling temperature. The adjunct steeping container 322 may have multiple compartments, some or all of the compartments may be selectable through the valve manifold 310.

Steam to heat the liquid may be produced by a steam generator 324, which may use water from a water reservoir 326 or other water source.

The system of embodiment 300 is merely one more example of using steam injection in a recirculating brewing system. In the various embodiments, a recirculating pump 306 may be illustrated as being upstream from the steam injector 308. Other embodiments may have the steam generator 308 upstream from the recirculating pump 306.

Some versions of a recirculating system may use the steam generator 324 instead of in conjunction with a recirculation pump 206 to recirculate liquid through the system. Such a version may have a check valve located upstream from the steam generator, and the injected steam may force the liquid in the recirculating loop to be pushed vertically upwards and through the piping. Some such versions may use siphons or other fluid circuit components to cause the fluid to move.

In the various examples of embodiments 100, 200, 202, and 300, a single steam generator system is shown. In some embodiments, multiple heat sources may be used. For example, a steam injection heating system may be used in conjunction with an open flame or steam jacket apparatus. The open flame or steam jacket may be used to raise the temperature of the liquid in a vessel quickly, and the steam injection system may be used to maintain fine control over the temperature.

Some embodiments may employ multiple steam injectors. An example may include a recirculating system with steam injection as well as direct steam injection into a wort reservoir. In such a system, the direct steam injector may assist in raising the temperature of the liquid in the reservoir with the recirculating system maintaining fine control as the liquid temperature reaches the desired set point. Other systems may have two or more steam injectors in a single recirculating system.

Figure 4:
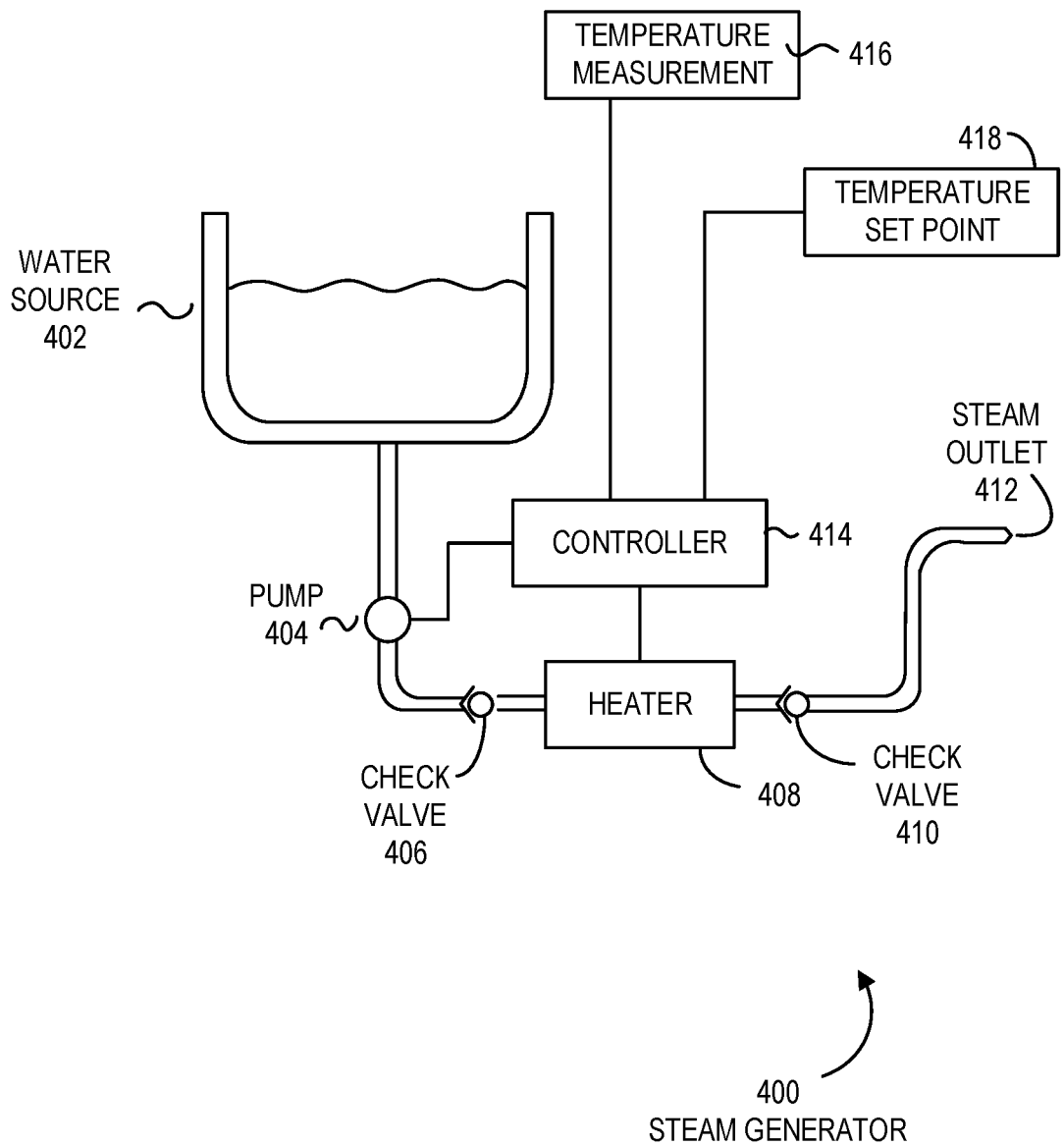
FIG. 4 is a diagram illustration of an embodiment showing a steam injection system.

FIG. 4 is a diagram illustration of an embodiment 400 showing a steam generator. The steam generator may be used to create steam from water, and the steam may be injected into wort to heat the wort during various stages of wort manufacture.

The steam generator of embodiment 400 may have a water source 402, which may be a reservoir or a connection to another water source, such as a building's potable water supply. A pump 404 may control the amount of water pulled from the water source 402.

Some embodiments may have a check valve 406 between the pump 404 and a heater 408. The check valve 406 may prevent steam generated by the heater 408 from flowing backwards towards the water source 402. Such a check valve 406 may be useful in situations where the pump 404 may not seal against backpressure, such as various types of so-called velocity pumps. Other pumps, such as positive displacement-type pumps, may have integral check valves such that a separate check valve 406 may be omitted.

The heater 408 may be an electrically operated heater that causes the liquid water to convert to steam. The steam may pass through a second check valve 410 prior to exiting through a steam outlet 412.

The check valve 410 may prevent wort or other liquid being heated from backing up into the heater 408. In some embodiments, the check valve 410 may be located very near or integrally with the steam outlet 412.

A controller 414 may use inputs of a temperature measurement 416 and a temperature set point 418 to determine when and how to operate the pump 404 and heater 408. In a simplified operation, the controller 414 may operate like a thermostat, where the controller 414 may cause steam to be generated when the temperature measurement 416 is lower than the temperature set point 418.

In many embodiments, the heater 408 may be kept at an operating temperature during normal operations. In such cases, operating the pump 404 may cause water to be introduced into the heater 408 and steam may be generated very quickly.

Some embodiments may use multiple stages of heating. For example, water in a reservoir or water source 402 may be preheated and maintained at a given temperature, and the preheated water may be introduced to the heater 408 to be converted to steam. In one example, a water reservoir may contain water preheated to temperatures in the range of 120-170 F. By preheating the water, less energy may be consumed in the transition to steam, which make such a system more responsive to generate steam quickly.

Some steam generators may use gravity to supply water rather than a pump. One version of such a system may use a valve or other mechanism to regulate the water introduced into the heater. Another version of such a system may use gravity to supply water, and may control the heating element to start and stop steam generation.

Figure 5:
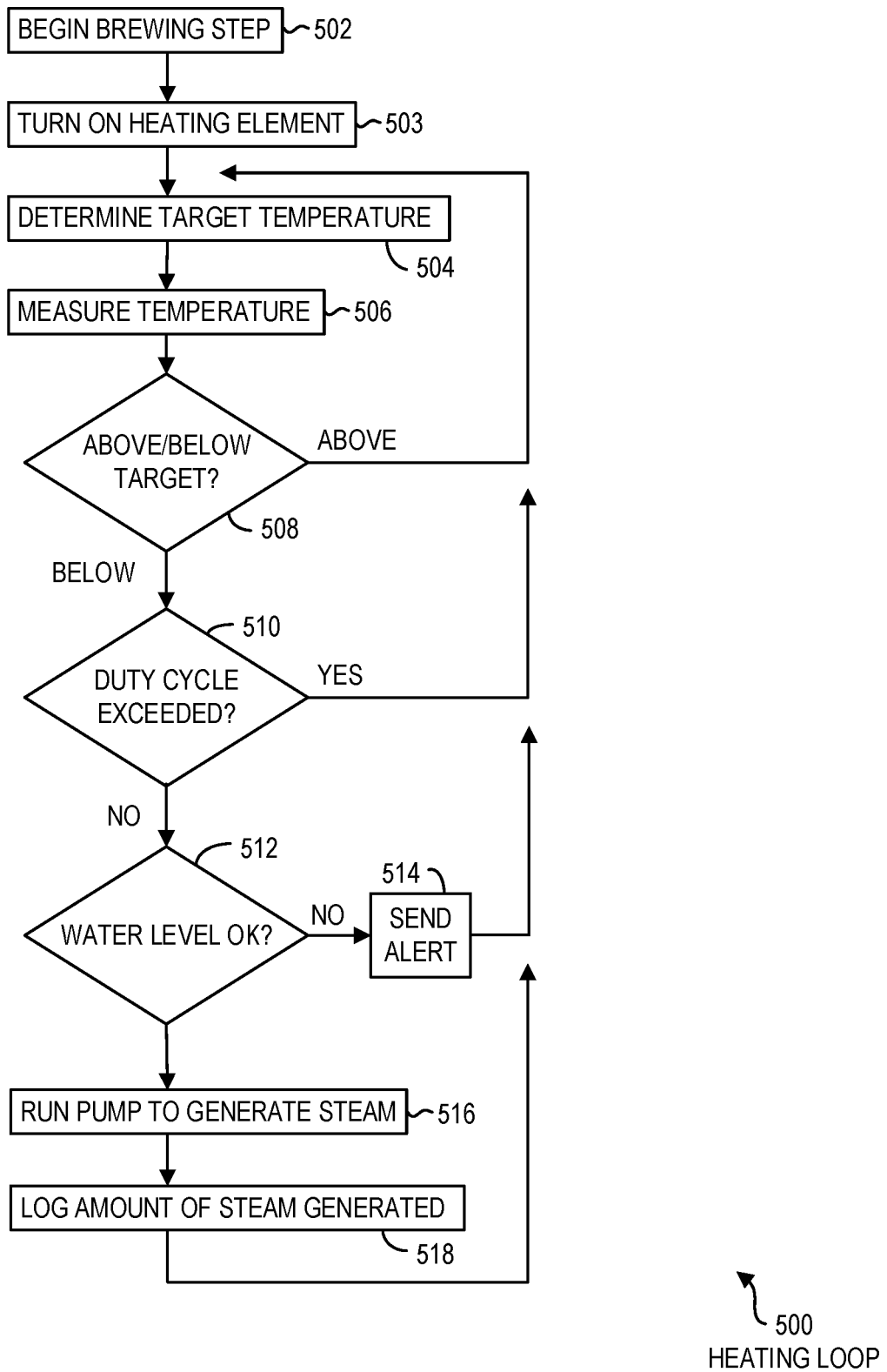
FIG. 5 is a flowchart illustration of an embodiment showing a method of a heating control loop.

FIG. 5 is a flowchart illustration of an embodiment 500 showing a simplified example of a heating operation that may be performed by a controller for a steam generator.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 500 is a simplified example of a control loop that may adjust a temperature of a liquid by adding steam to raise the temperature. The control loop may have a duty cycle management function that may limit the steam generated based on an operational duty cycle. The duty cycle may be a restriction on the amount of steam that may be generated over a period of time, and limited duty cycles may be useful when full time of 100% usage may cause overheating or other limitations.

A brewing step may begin in block 502. The brewing step may be controlled by a second controller that may automate some or all of a brewing process. Such a controller may have a recipe from which various process parameters, steps, and other information may be extracted. At a specific brewing step, such a controller may transmit a target temperature to a steam controller in block 504.

Prior to entering a control loop, the heating element that generates steam may be turned on in block 503. Some hardware systems may have a steam heater that may maintain a constant temperature and steam may be generated by introducing water into the heating element. In such systems, the heating element may be not be turned on and off frequently, and may generally be turned on and left on during an entire step of a brewing process.

A measurement may be made in block 506 for a liquid to be heated. If the temperature is at or above the target temperature in block 508, the process may loop back to block 504 to determine if any changes have been made to the target temperature. If the measured temperature is below the target temperature in block 508, the system may be calling for additional heat.

A duty cycle of the steam injection system may play a part in limiting the amount of steam generated. In some systems, operating at 100% duty cycle may cause malfunctions, excessive electrical drain, excessive heat, or other mechanical issues with the equipment. When a duty cycle is imposed on the system, if the duty cycle has been exceeded in block 510, the control loop may return to block 504 until the duty cycle has been satisfied.

In block 512, a check of the water supply may be made. When the water level is low or water is otherwise not available, an alert may be sent in block 514 and no steam may be generated. Some systems may also shut off a steam heating element under these circumstances as well.

The pump may be engaged in block 516 to cause water to generate steam. In the example of embodiment 500, the operations of block 516 may be performed for a specific length of time, which may be a single second or handful of seconds, for example. Other embodiments may turn on the pump and allow the pump to operate continually while the heating loop cycles multiple times until conditions arrive where the pump may be turned off.

As the pump operates, a log may be made of the amount of steam or water added to the liquid being heated. Such a measurement may be used later to adjust the concentration of liquid being heated.

Figure 6:
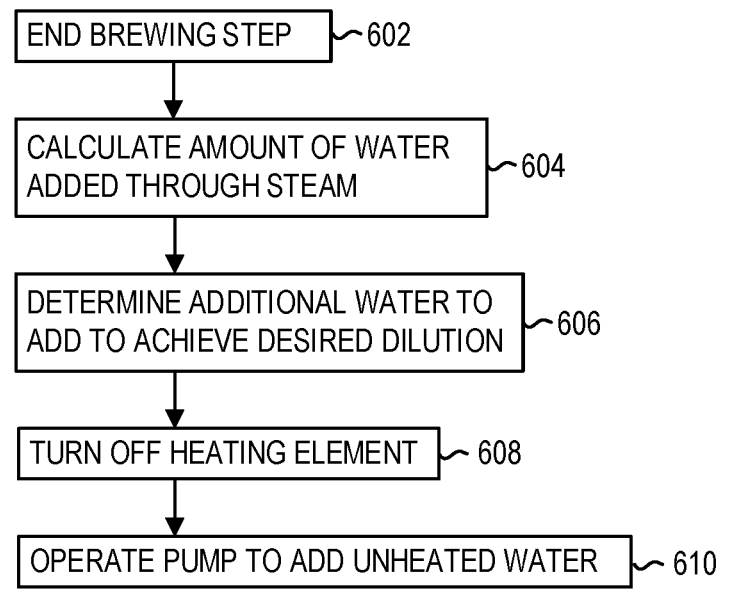
FIG. 6 is a flowchart illustration of an embodiment showing a method for adding water to adjust dilution using a steam injection system.

FIG. 6 is a flowchart illustration of an embodiment 600 showing a simplified example of an operation to adjust the concentration of wort after a brewing step may be completed.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

As steam may be injected into a liquid, the dilution or concentration of materials in the liquid may change because the water contained in the steam becomes incorporated into the liquid. Many beer recipes are designed to have a specific concentration of sugars or other suspended or dissolved components, and for steam injection heating, such recipes may be designed to have a slightly higher concentration at the beginning, with the expectation that the steam may dilute the liquid as heat is applied.

The amount of water added to the liquid through the steam injection process may vary from one situation to another. The ambient temperature, humidity, initial temperature of the water, additives in the water, temperature of the heating element, or other factors may cause different amounts of water to be added from one usage to another. Recognizing this situation, some systems may make an adjustment to the dilution after heating to achieve a desired concentration.

Such systems may have a recipe that results in a more concentrated solution based on the estimated amount of steam A brewing step may end in block 602. From a log of the amount of steam injected, a total amount of water added through steam injection may be determined in block 604. An amount of additional water to be added may be calculated in block 606 to achieve a desired dilution.

The heating element of a steam generator may be turned off in block 608 and the steam generator pump may be operated in block 610 to add unheated water to the wort. The unheated water may dilute the wort to a desired level to match a recipe.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
   a water input;
   a pump having an electrical input;
   a heater;
   a steam injector, said steam injector having a liquid connection configured to inject steam into a processed liquid;
   a connection from said steam injector to a reservoir that contains said processed liquid;
   plumbing connecting said water input, said pump, said heater, and said steam injector in sequence;
   a controller having:
      a temperature sensor input;
      a temperature set point input for said processed liquid; and
      a pump output connected to said electrical input of said pump.

2. The system of claim 1 further comprising a check valve.

3. The system of claim 2, said check valve being located between said heater and said steam injector.

4. The system of claim 2, said check valve being located between said pump and said heater.

5. The system of claim 1, said water source being a water reservoir.

6. The system of claim 1, said pump being one of a group composed of:
   a peristaltic pump;
   a diaphragm pump; and
   a positive displacement pump.

7. A controller comprising:
   a set point input for a processed liquid stored in a reservoir;
   a temperature measurement input;
   a pump output;
   a heater output;
   said controller being configured to:
      determine a target temperature from said set point input;
      determine a current temperature of a processed liquid from said temperature measurement input;
      determine that said current temperature is below said target temperature; and
      activate said pump output and said heater output to cause steam to be generated and injected into said processed liquid.

8. The controller of claim 7 being further configured to:
   determine an amount of water added to said processed liquid over a period of time, said amount of water being added primarily as steam.

9. The controller of claim 8 being further configured to:
   determine a second amount of water to be added as liquid; and
   activate said pump output to cause said water to be added as liquid to said processed liquid.

\* \* \* \* \*